Dec. 4, 1928.
W. B. WELDON
METHOD AND APPARATUS FOR LOCATING THE POINT OF
ESCAPE OF A FLUID FROM CONCEALED PIPES
Filed June 23, 1927
1,693,737
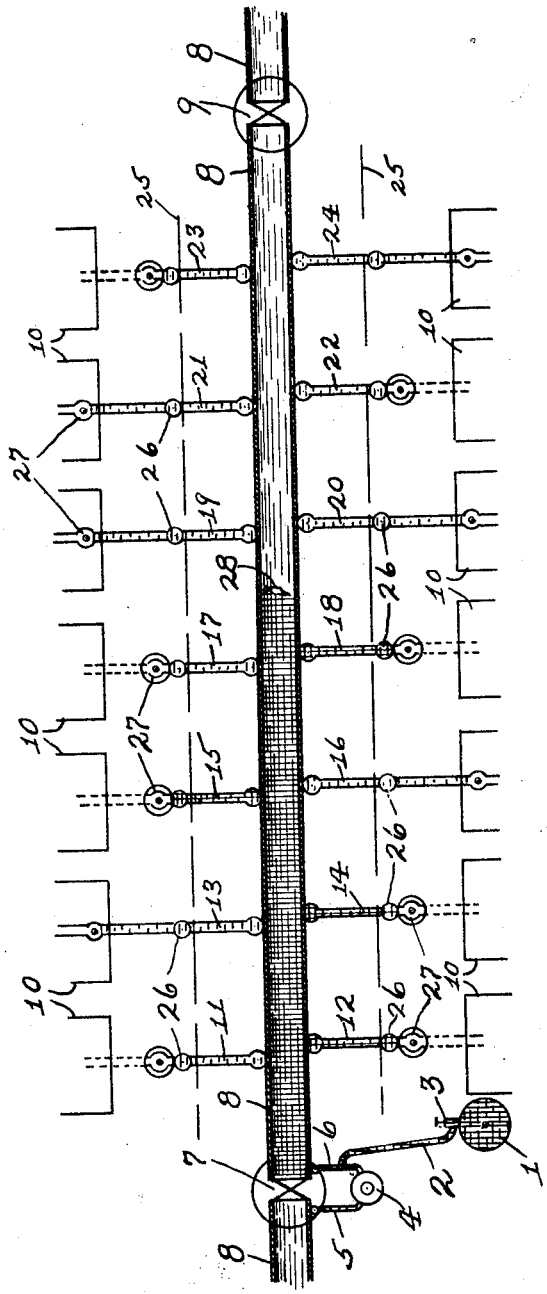
Inventor
William B. Weldon
By Brayton Richards
Attorney Patented Dec. 4, 1928.

1,693,737

UNITED STATES PATENT OFFICE.

WILLIAM B. WELDON, OF CHICAGO, ILLINOIS, ASSIGNOR TO WILLIAM S. DARLEY, OF CHICAGO, ILLINOIS.

METHOD AND APPARATUS FOR LOCATING THE POINT OF ESCAPE OF A FLUID FROM CONCEALED PIPES.

Application filed June 23, 1927. Serial No. 200,990.

My invention relates to improvements in method and apparatus for locating the point of escape of fluid from concealed pipes and has for its object the provision of an improved method and apparatus of this character by means of which such points may be quickly and efficiently located.

A further object of the invention is to provide a method and apparatus by means of which leaks in underground water mains may be quickly, positively and definitely located.

Other objects will appear hereinafter.

In general the objects of the invention will be attained by providing a tank partially filled with a dye solution and with air under pressure and having connections by means of which the dye can be introduced into the pipe or main to be tested. An ordinary meter is employed to determine the rate of flow due to the leakage and from this the times of flow from the meter to the various outlets from the main are calculated and tabulated. Then a suitable quantity of the dye is introduced into the main at the meter. After sufficient time has elapsed for the dye to reach the nearest branch or outlet, water is drawn from the main through said outlet and if the dye is present this test shows that the leak is beyond said outlet. Such tests are continued until two points are reached where the dye is and is not detected. This indicates that the leak is between said parts. Then the water is permitted to flow from the farthest point until the dye is indicated and the quantity thus withdrawn is measured or noted. From this the location of the leak back from the last mentioned point of withdrawal may be readily calculated.

The invention consists in the method and apparatus hereinafter described and claimed.

The invention will best be understood by reference to the accompanying drawing forming a part of this specification and in which the view is a diagrammatic view illustrating an ordinary underground water main having a leak therein and being tested for location of said leak.

The preferred apparatus for carrying on the method comprises a suitable tank 1 adapted and arranged to contain a dye solution and air under pressure. Said tank is supplied with about seven gallons of water and two tablespoonfuls of fuchsine dye crystals, thus making a deep red dye solution. The tank should be of about fifteen gallons capacity, so that it is about half filled by the dye solution, and air under pressure is then introduced into the tank until it has a pressure of from 100 to 200 pounds per square inch according to the main which is to be tested.

The tank 1 is provided with a discharge hose or tube 2 and a controlling valve 3. Associated with the tank 1 is an ordinary master water meter 4 having branch hoses or tubes 5 and 6 and suitable connections whereby said meter may be connected on opposite sides of the valve 7 in the water main 8, as indicated. A suitable connection is also provided between the hose 2 and the hose 6 whereby the tank 1 may be connected with hose 6 and main 8, as shown.

In the example illustrated diagrammatically in the drawing it is presumed that there is a leak located somewhere between the valve 7 and the valve 9 of the main 8. The various supposed residences on opposite sides of the supposed street under which the water main 8 is supposed to be laid are indicated diagrammatically at 10 on opposite sides of said street and main, the relative size of the main and connecting parts being exaggerated for the sake of clearness. As indicated, the main 8 is provided with the service branch connections 11, 12, 13, 14, 15, 16, 17, 18, 19, 20, 21, 22, 23 and 24 leading into and supplying the various residences 10 with water in the usual way. The curb lines of the street are indicated roughly by the broken lines 25 and the curb cocks for controlling the flow of water to the residences are indicated roughly at 26. The meter for measuring the flow of water into the residences are indicated at 27, some being parkway meters and other basement meters, as indicated.

In applying the method for locating the leak we will assume that the leak is located, as indicated, at the point 28. The valves 7 and 9 are first closed and all service to the various residences is discontinued, the curb cocks 26 being closed. Then the meter 4 is attached with the hoses 5 and 6 connected on opposite sides of the valve 7 and whereby the rate of flow of water due to the leak 28 may be accurately measured. The distances of the various branches or outlets 11 to 24 from the valve 7 are known and from the rate of flow thus determined by the meter 4 the times of flow from the valve 7 to each of the outlets or branches 11 to 24 is calculated and tabulated. Then the tank 1 is connected by hose 2 with the hose 6 and the valve 3 is opened to inject a suitable quantity of the dye from tank 1 into the main 8, as will be readily understood, the pressure in tank 1, of course, being greater than the pressure in the main 8. After a lapse of time sufficient to permit the dye to flow to an adjacent outlet branch 12, the corresponding curb cock 26 is opened and water drawn from a faucet in the corresponding residence until the known quantity in the branch 12 has been exhausted, whereupon the succeeding flow is carefully examined for presence of the dye from tank 1. If no dye is present after the lapse of sufficient time, the leak must be located between the outlet 12 and the valve 7. If, however, the leak is located at 28, as indicated in the drawing, the dye will be detected from outlet 12 and the test must be proceeded with. Thus each of the succeeding outlets 14, 15, 18 and 20 are tested until it will be found that the dye is not present in the water first drawn through the outlet or branch 20. This is due to the fact that all service has been discontinued and that the only flow is through the leak 28. This being so the main 8 beyond the leak 28 contains only dead water and the dye will be carried from the valve 7 only up to the leak 28, as indicated by the vertical shading in the drawing. When it has been definitely determined that there is no dye in the main at the point from which the outlet 20 branches, the outlet 20 is again opened and the flow permitted to continue until the dye appears in the outflow, the withdrawal being carefully measured. This withdrawal represents the holding capacity of the main 8 between the outlet 20 and the leak 28. The capacity of the main 8 is known and from this obviously the exact location of the leak 28 may be calculated, it requiring so many feet of the main 8 to contain the water which was thus withdrawn before the dye appeared. By digging at the point thus located the leak may be uncovered and repaired without the necessity of exploratory excavations as is usually necessary. In this way the location of a leak may be ordinarily quickly located and determined.

In case the leak is a slow one or the section of main affected, an unusually long one, the test may occupy a longer time than it is possible or permissible to entirely close off the service from the residences affected. In such cases the test may be made in sections and on different days.

To illustrate, we will assume that on the first day tests were made down to the outlet 18 and the presence of the dye detected on each occasion and that then it was necessary to discontinue the test and restore the water service. A record would be kept of the test made and on the next day all service branches beyond branch 18 toward the valve 9 would be again closed, the other service branches being left open for use of the water in the normal way. Then tank 1 would be connected with the branch 18 and dye introduced into the main 8 at this point and beyond which it is known that the leak exists. There can be no back flow through the main 8 so that during these tests water may freely be drawn from the service branches 11, 12, 13, 14, 15 and 16 without danger of contamination by the dye. The branch service 17 would probably have to be closed because it is so nearly opposite the branch service 18 that dye might be transferred. With the dye being introduced through the pipe the tests are continued as before and, in the example illustrated, it will be discovered, as before, that the leak exists between service branches 18 and 20 and will be definitely located just as before.

Some inaccuracy in the test may be due to the lack of definite knowledge of the volume of pipe due to incrustation and sedimentation. Some correction should also be made for the velocity coefficient in the main. It has been found that the dye travel is somewhere between the average velocity and the maximum velocity at the center of the pipe. The leaks have been found 2 feet to 60 feet from the location, as indicated by the test. The allowance necessary for such uncertain factors is a question of judgment and experience but it will be found that by means of this apparatus and the tests outlined a leak can usually be very closely located.

When the tests have been completed the valves 7 and 9 are opened and water drawn through the various branch service pipes until all trace of the dye disappears.

While I have illustrated and described the preferred apparatus and method for carrying on my invention, these are capable of variation and modification without departing from the spirit thereof. I, therefore, do not wish to be limited to the precise details disclosed but desire to avail myself of such variations and modifications as fall within the scope of the appended claims.

I claim:

1. The method of locating the point of escape of fluid from a concealed pipe, which consists in first preventing free and unknown flow in said pipe; then introducing a detectable substance into said pipe; and then withdrawing fluid from said pipe at various distances from the point of introduction until two adjacent points are found to which said detectable substance has and has not penetrated.

2. The method of locating the point of escape of fluid from a concealed pipe, which consists in first preventing free and unknown flow in said pipe; then introducing a detectable substance into said pipe; then withdrawing fluid from said pipe at various distances from the point of introduction until two adjacent points are found to which said detectable substance has and has not penetrated; then withdrawing fluid from the point to which said substance has not penetrated until said substance appears; and then calculating the location of the point of escape from the amount of fluid last withdrawn.

3. The method of locating the point of escape of fluid from a concealed pipe, which consists in first preventing free and unknown flow in said pipe; then determining the rate of flow through said pipe due to said escape; then introducing a detectable substance into said pipe; and then withdrawing fluid from said pipe at various distances from the point of introduction until two adjacent points are found to which said detectable substance has and has not penetrated.

4. The method of locating the point of escape of fluid from a concealed pipe, which consists in first preventing free and unknown flow in said pipe; then determining the rate of flow through said pipe due to said escape; then introducing a detectable substance into said pipe; then withdrawing fluid from said pipe at various distances from the point of introduction until two adjacent points are found to which said detectable substance has and has not penetrated; then withdrawing fluid from the point to which said substance has not penetrated until said substance appears; and then calculating the location of the point of escape from the amount of fluid last withdrawn.

5. The method of locating a leak in an underground water main which consists in first shutting off the service to and from said main; then supplying water to said main through a meter and measuring the flow due to said leak by said meter; then calculating and tabulating the rate of flow from said meter to various branch outlets from said main; then introducing a dye solution under pressure into said main at said meter; then withdrawing water from said branch connections at various distances from the point of introduction until two adjacent branch connections are found to which said dye has and has not penetrated; then withdrawing water from the connection to which said dye has not penetrated until said dye appears; and then calculating the location of the point of leak from the amount of fluid last withdrawn.

6. The combination with a pipe containing fluid under pressure of a valve by means of which normal flow of fluid through said pipe may be discontinued; a meter with connections for bridging said valve whereby flow of fluid through said pipe may be measured; a tank containing a dye under pressure; means for connecting said tank with said pipe for the introduction of said dye into said pipe; and means for withdrawing fluid from said pipe at various points.

7. The method of locating the point of escape of fluid from a concealed pipe, which consists in first limiting the flow of fluid in said pipe to that due to said escape; and then withdrawing fluid from said pipe at various distances from the point of introduction until two adjacent points are found to which said detectable substance has and has not penetrated.

8. The method of locating the point of escape of fluid from a concealed pipe, which consists in first limiting the flow of fluid in said pipe to that due to said escape; then introducing a detectable substance into said pipe; then withdrawing fluid from said pipe at various distances from the point of introduction until two adjacent points are found to which said detectable substance has and has not penetrated; then withdrawing fluid from the point to which said substance has not penetrated until said substance appears; and then calculating the location of the point of escape from the amount of fluid last withdrawn.

9. The method of locating the point of escape of fluid from a concealed pipe, which consists in first limiting the flow of fluid in said pipe to that due to said escape; then determining the rate of flow through said pipe due to said escape; then introducing a detectable substance into said pipe; and then withdrawing fluid from said pipe at various distances from the point of introduction until two adjacent points are found to which said detectable substance has and has not penetrated.

10. The method of locating the point of escape of fluid from a concealed pipe, which consists in first limiting the flow of fluid in said pipe to that due to said escape; then determining the rate of flow through said pipe due to said escape; then introducing a detectable substance into said pipe; then withdrawing fluid from said pipe at various distances from the point of introduction until two adjacent points are found to which said detectable substance has and has not penetrated; then withdrawing fluid from the point to which said substance has not penetrated until said substance appears; and then calculating the location of the point of escape from the amount of fluid last withdrawn.

In witness that I claim the foregoing as my invention, I affix my signature this 16th day of June, A. D., 1927.

WILLIAM B. WELDON.